United States Patent [19]

Khatti et al.

[11] 4,030,295

[45] June 21, 1977

[54] CONTROL VALVE FOR TRACTOR-IMPLEMENT HYDRAULIC SYSTEM

[75] Inventors: Ramkishan Khatti, Racine; Patrick M. Lourigan, Kenosha, both of Wis.

[73] Assignee: J. I. Case Company, Racine, Wis.

[22] Filed: June 3, 1976

[21] Appl. No.: 692,293

[52] U.S. Cl. ............................ 60/445; 60/450; 60/452; 172/7

[51] Int. Cl.² ........................................ F16H 39/46

[58] Field of Search ............ 60/433, 443, 445, 450, 60/451, 452, 462, 465; 172/7, 9

[56] References Cited

UNITED STATES PATENTS

| | | | |
|---|---|---|---|
| 3,235,010 | 2/1966 | North | 60/462 X |
| 3,486,334 | 12/1969 | Miller | 60/450 |
| 3,604,312 | 9/1971 | Plate | 91/433 |
| 3,865,514 | 2/1975 | Lonnemo | 60/452 UX |

*Primary Examiner*—Edgar W. Geoghegan

*Attorney, Agent, or Firm*—Dressler, Goldsmith, Clement, Gordon & Shore, Ltd.

[57] ABSTRACT

A tractor-implement hydraulic system having a valve interposed between a cylinder-piston assembly, a reservoir and a variable displacement pressure and flow compensated pump having compensating means is disclosed herein. The valve has a housing which has a bore supporting a valve spool and an inlet chamber and pressure chamber in communication with the valve bore with the inlet chamber being connected to the pump while the pressure chamber is connected to both the cylinder and the compensating means so that the cylinder and compensating means are immediately interconnected when the valve spool is actuated in one direction. The valve housing also has a return passage between the cylinder and the reservoir with a valve therein that normally blocks flow and is opened in response to movement of the valve spool in an opposite direction.

4 Claims, 4 Drawing Figures

CONTROL VALVE FOR TRACTOR-IMPLEMENT HYDRAULIC SYSTEM

BACKGROUND OF THE INVENTION

The present invention relates to a hydraulic control system particularly adapted for tractor-implement correlation. More particularly, the present invention relates to a control valve that is actuated in response to the draft load imposed on the tractor by a ground engaging implement to control the position of the implement in accordance with such a load.

Hydraulic systems of this type have taken various forms. One type of system is disclosed in North, U.S. Pat. No. 3,235,010, portions of which are consistent with this disclosure being incorporated herein by reference. The North patent, which is assigned to the assignee of the present invention, discloses a control valve wherein accurate implement positioning is obtained by providing relatively small fluid flow interiorly of the hydraulic system when small incremental changes are necessary. The valve is designed so as to provide increased flow when a greater change in implement positioning is necessary.

The control valve disclosed in the North patent is what is commonly referred to as an open-center system. An open-center system incorporates a fixed displacement pump that is capable of delivering a maximum given flow required for the entire system and the control valve associated therewith connects the pump directly to the reservoir when the valve is in the neutral position. As expected in a system of this type, the pump is constantly delivering full flow at low pressure when the control valve is in a neutral position which results in energy loss. Furthermore, in most hydraulic control systems, the system is designed so as to provide a maximum flow rate which is seldom needed for operation of the unit being controlled. Thus, in most instances at least a portion of the power is wasted since the system seldom demands the maximum flow of the pump and the excess flow is bypassed, which means that further energy is lost.

While an open-center system has various drawbacks, to date, most manufacturers of agricultural implements still utilize such a system because no suitable acceptable alternate is available.

Another system that has been used in what is known as a closed-center system. The closed-center system or circuit incorporates a variable displacement, pressure compensated pump capable of a given maximum flow rate and the system is always operated at a maximum pressure. In this system, power is again wasted when less than the full presence is required for oerating the controlled unit. In this system, the pump is constantly operating at full pressure which may result in heating of the fluid when the system requires a lower pressure than maximum for extended periods of time.

Quite recently a third type of system has been developed which may be termed as a "load-sensing or pressure-flow compensated (PFC)" hydraulic system. This type of system is generally disclosed in U.S. Pat. No. 3,486,334. The hydraulic circuit disclosed in this patent consists of a variable displacement pump, the output of which is controlled by a pressure compensating member so that the pump produces the required flow at a pressure of approximately 200–400 PSI above required pressure for delivery to a controlled unit. This type of hydraulic circuit delivers low flow at low pressure for minimum pump wear, flow losses and energy losses when the valve is in a neutral position. This type of a system has the unique advantage of being capable of maintaining high pressures without delivering a large volume of fluid and also delivering larger volumes of fluid at lower pressures.

Plate et al. U.S. Pat. No. 3,604,312 discloses a hydraulic control circuit for a tractor-implement hydraulic system which incorporates the "load-sensing" hydraulic system. However, such a system has not found any large measure of commercial success. It is believed that part of the reason for the lack of commercial success in the draft control art is the complicated arrangement of the control valve that is required for incorporation into the draft control system. Some of the shortcomings of the control system of the type disclosed in the Plate et al. patent are that the system is slow to respond to draft load changes. Also, because of the particular valve construction, it is possible for some leakage to occur and result in reducing the pressure in the hydraulic cylinders that are associated with the implement when such pressure reducing is not desired. Furthermore, such leakage will result in the implement lowering when the system is in a neutral position and the vehicle is shut down.

SUMMARY OF THE INVENTION

According to the present invention, a control valve has been developed which can be manufactured at a minimum cost and incorporates a minimum number of moving parts thereby decreasing the maintenance cost. The control valve of the present invention is designed for use with a "pressure flow compensated" hydraulic control system for controlling the raising and lowering of an implement on a tractor in response to changes in draft load on the implement. The system is, of course, capable of being manually actuated when desired.

The control valve of the present invention is specifically designed for use with a tractor-implement hydraulic system and is located between a cylinder and piston assembly, a reservoir and a variable displacement pressure compensated pump having compensating means associated therewith.

The unique valve includes the normal valve bore and a valve spool slidable therein with a pair of chambers in communication with the valve bore at axially spaced locations. One of these chambers is connected directly to the pump while the second chamber is connected to both the compensating means of the pump and one end of the cylinder through first and second unidirectional valves that limit flow in a direction from the chamber to the cylinder and the pressure compensating means, respectively. The control valve housing also has a third passage that defines a return chamber between the cylinder and the reservoir with valve means that normally blocks flow through the third passage. The valve spool is configured so as to interconnect the two chambers when the valve spool is moved in one direction from the neutral position and open the third or return passage when the valve spool is moved in the opposite direction from the neutral position.

According to one aspect of the invention, the valve spool and bore have orifice means that define a variable orifice between the two chambers which results in metered flow during the initial movement of the valve spool in the one direction.

According to another aspect of the invention, the chamber connected to the compensating means and to

DETAILED DESCRIPTION

Figure 1:
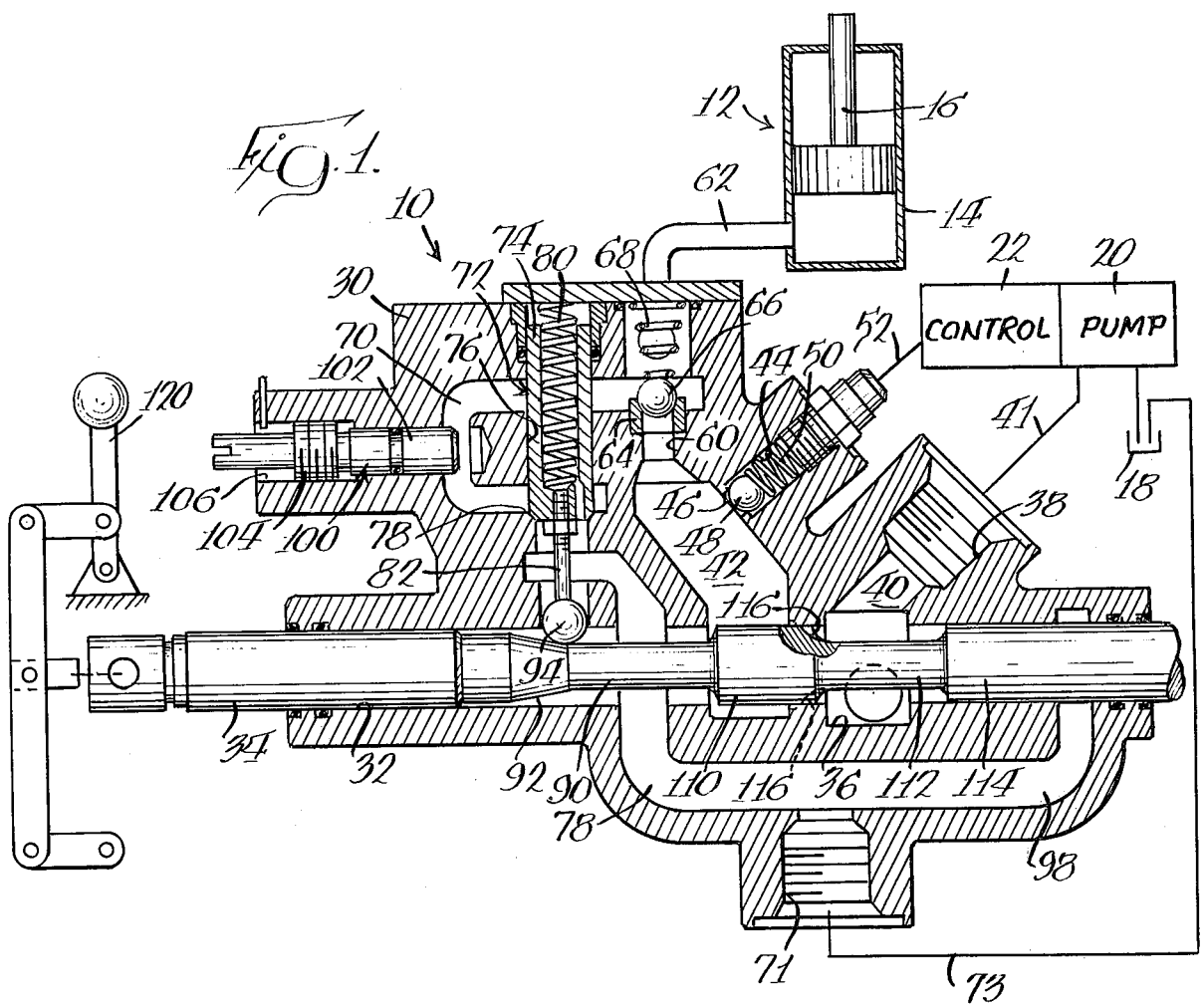
FIG. 1 of the drawings discloses a tractor-implement hydraulic control circuit having the new control valve incorporated therein, which valve is shown in cross section.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings schematically illustrates a tractor-implement hydraulic system that includes a valve 10 interposed between a one-way implement-actuating assembly 12 consisting of a cylinder 14 which slidably supports a piston rod 16. The hydraulic control system also includes a fluid source or reservoir 18 and a variable displacement pressure and flow compensated pump 20 that has a compensating means 22 associated therewith.

Control valve 10 consists of a valve housing 30 that has an elongated valve bore 32 extending therethrough with a valve spool 34 slidably supported in valve bore 32. Valve housing 30 has a first or inlet chamber 36 that surrounds valve bore 32 to be in communication therewith and also is in communication with an inlet port 38 through a passage 40. Inlet port 38 is connected by a conduit 41 to pump 20. Valve housing 30 also has a second or pressure chamber 42 that is in communication with valve bore 32 at a location axially spaced from chamber 36. Valve housing 30 has a first passage 44 extending from the periphery thereof and in communication with chamber 42 through a reduced valve seat portion 46 at the inner end thereof. A unidirectional valve 48, commonly a ball check valve, is normally biased into engagement with valve seat 46 through a spring 50. The first passage 44 is connected to the pressure compensating means or pump control 22 through a conduit 52.

Pressure chamber 42 also has a second passage 60 leading therefrom to the peripheral surface of valve housing 30 and this second passage 60 is connected to one end of cylinder 14 through a conduit 62. Passage 60 has an insert 64 which defines a valve seat for a unidirectional valve means consisting of a ball check valve 66 that is normally biased into engagement with valve seat 64 through spring 68. Valve housing 30 has a third or return passage 70 that leads from one end of cylinder 14, more specifically conduit 62, to a return port 71 that is connected by line or conduit 73 to reservoir 18. In order to simplify the construction of the valve and the connections between the valve and fluid ram 12, passage 70 preferably intersects passage 60 at a location downstream of check valve 66 so that fluid is free to flow from conduit 62 into passage 70 when check valve 64 is in a closed condition.

Third passage 70 has means 72 therein that normally blocks flow from cylinder 14 to reservoir 18. This means 72 consists of a spring biased valve element 74 that is slidably supported in an opening 76 which intersects passage 70 and the lower end of valve element 74 cooperates with a valve seat 78 defined in passage 70. Valve element 74 is normally biased to a closed position by a spring 80 and the valve element has an actuating stem 82 extending from the lower end thereof. Valve means 72 is opened in response to movement of the valve spool 34. For this purpose, valve spool 34 has a reduced portion 90 with an enlarging tapered portion 92 on one end of reduced portion 90. A ball 94 is interposed between stem 82 and tapered portion 92. Thus, movement of the valve spool 34 to the right as viewed in FIG. 1 will cause the ball to ride up on tapered portion 92, overcoming the forces of spring 80, to open passage 70 for allowing fluid flow from conduit 62 to conduit 73 and reservoir 18.

Return passage 70 also has an extension 98 that intersects bore 32 at a location spaced from chamber 36 so that any fluid that leaks from chamber 36 between valve bore 32 and valve spool 34 will automatically be returned to the reservoir. Third passage 70 also has a regulator valve 100 cooperating therewith. Regulator valve 100 has an end portion 102 which extends across passage 70 and an opposite portion 104 that is threadedly received into an opening 106 in housing 30. Thus, rotation of regulating valve 100 in the appropriate direction will vary the volume of flow that is capable of being delivered through passage 70 from cylinder 14.

Returning now to the construction of valve spool 34, a land or enlarged portion 110 is located on the opposite end of reduced portion 90 and a further reduced portion 112 is located on the opposite end of enlarged land 110 while a further land 114 is located on the opposite end of reduced portion 112.

According to one aspect of the invention, the juncture between land 110 and reduced portion 112 has a plurality of circumferentially spaced notches 116 which define orifice means between spool 34 and bore 32. These notches are configured so as to provide a minimum amount of flow when the valve spool is initially moved to the left as viewed in FIG. 1 and to progressively increase this amount as the valve spool is moved further to the left so as to provide a variable orifice between inlet chamber 36 and pressure chamber 42.

OPERATION

Considering now the operation of the control valve, in the neutral position illustrated in FIG. 1 of the drawings, valve element 74 is biased to a seated position against valve seat 78 to prevent any flow from one end of cylinder 14 to reservoir 18. Also, communication between chambers 36 and 42 is blocked by land 110 while chamber 42 is in communication with passage 78 through valve bore 32. This insures that there is no pressure build up of fluid in pressure chamber 42 sufficient to cause valve elements 48 and 66 to open when such opening is not desired. This insures that the implement (not shown) associated with fluid ram 12 is not raised when it is not desired.

Figure 2:
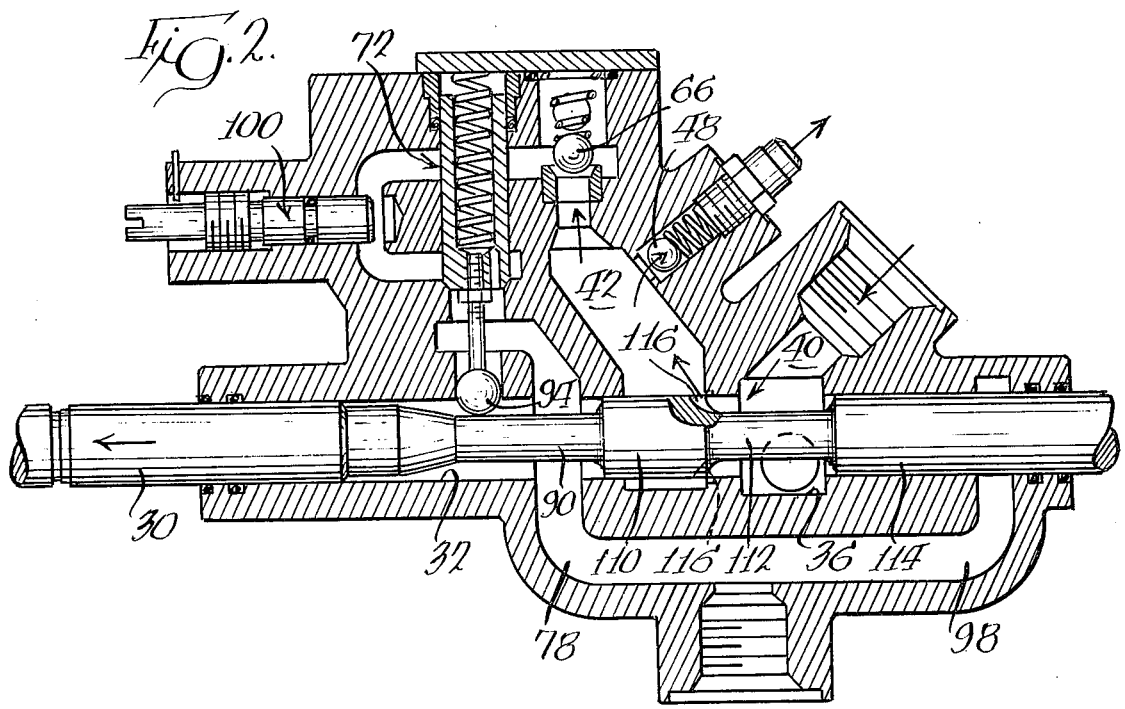
FIG. 2 is a view similar to FIG. 1 showing the control valve in a first actuated position.

Assuming now that the linkage, of the type shown in the above mentioned North patent, senses an increase in draft load which would call for a raising of the implement by supplying fluid to the head end of cylinder 14, such increased load would move the valve spool to the left from the position illustrated in FIG. 1 to the position illustrated in FIG. 2. In this position, it will be noted that the notches 116 and bore 32 interconnect chambers 36 and 42 so that the pump pressure of pump 20 will pressurize the chamber 42. It should be noted that the pump 20 and pressure compensating means 22 are adjusted so that under a "no flow" condition, the output pressure of pump 20 is set for approximately 300 p.s.i.

The pressurized fluid from pump 20 is received into pressure chamber 42 and opens both check valves 48 and 66 to cylinder 14 and pressure compensating device 22 simultaneously. Since the flow from inlet chamber to pressure chamber 42 is restricted by the variable orifice means 116, the pressure of the fluid developed in cylinder 14 will cause a build up of pressure in chamber 42 and this pressure will also be sensed by pressure compensating means 22 so that the pump output pressure will be automatically increased as a function of the pressure of the fluid in cylinder 14. Of course, this pressure of fluid in cylinder 14 is dependent upon the load of the implement and the pump output pressure will always be approximately 300 p.s.i. greater than the pressure in cylinder 14.

Assuming that the variable flow through variable orifice means 116 is from 0 to approximately 5 gallons per minute, depending upon the position of the spool with respect to the neutral position shown in FIG. 1, the amount of fluid being delivered to cylinder 14 can be accurately controlled by movement of valve spool 34 in response to the demands of the particular system.

Figure 3:
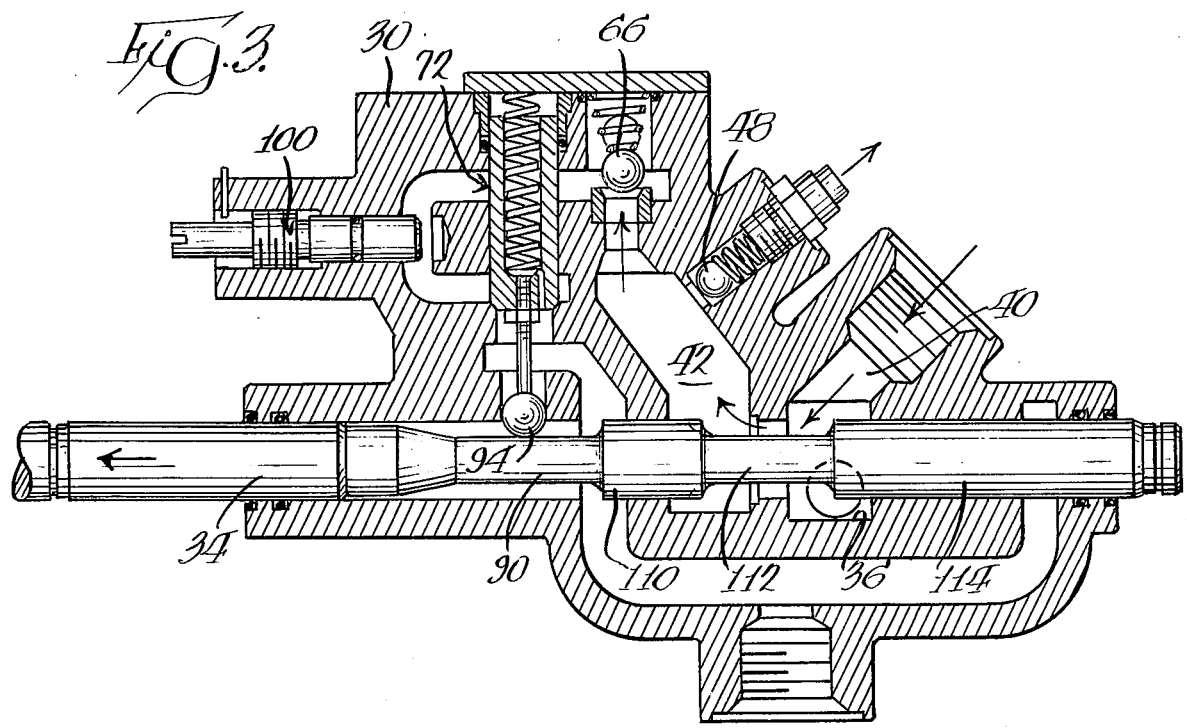
FIG. 3 is a view similar to FIG. 2 showing the valve spool in a second actuated position for maximum flow.

Assuming now that the operator wishes to rapidly raise the implement, control lever 120 is actuated so as to move valve spool 34 fully to the left as illustrated in FIG. 3. In this position, the valve spool has moved a sufficient distance so that lands 110 and 114 are positioned to provide unrestricted flow between inlet chamber 36 and pressure chamber 42. Since the flow between the two chambers at this point is unrestricted, it becomes impossible to maintain the 300 p.s.i. pressure differential between the two chambers and the pump will therefore be providing a maximum flow capability, such as 30 gallons per minute, into chamber 42 and also into cylinder 14.

When it is desired to lower the implement, valve spool 34 is moved to the right as viewed in FIG. 1. As valve spool 34 is moved to the right, (see FIG. 4) ball 94 rides up along tapered surface 92 on valve spool 34 and moves valve element 74 against the pressure of spring 80 to unseat the valve element from valve seat 78 and provide a flow path from cylinder 14 to reservoir 18 through passage 78. Of course, it will be appreciated that the amount of flow through passage 78 will be dependent upon the position of valve spool element 74 and valve seat 78. Also, the maximum amount of flow through passage 78 will be determined by the adjustment of regulator valve 100. This fluid flow from cylinder 14 is produced by the pressure that is developed resulting from either the weight of the implement or from the implement tending to enter into the ground.

Figure 4:
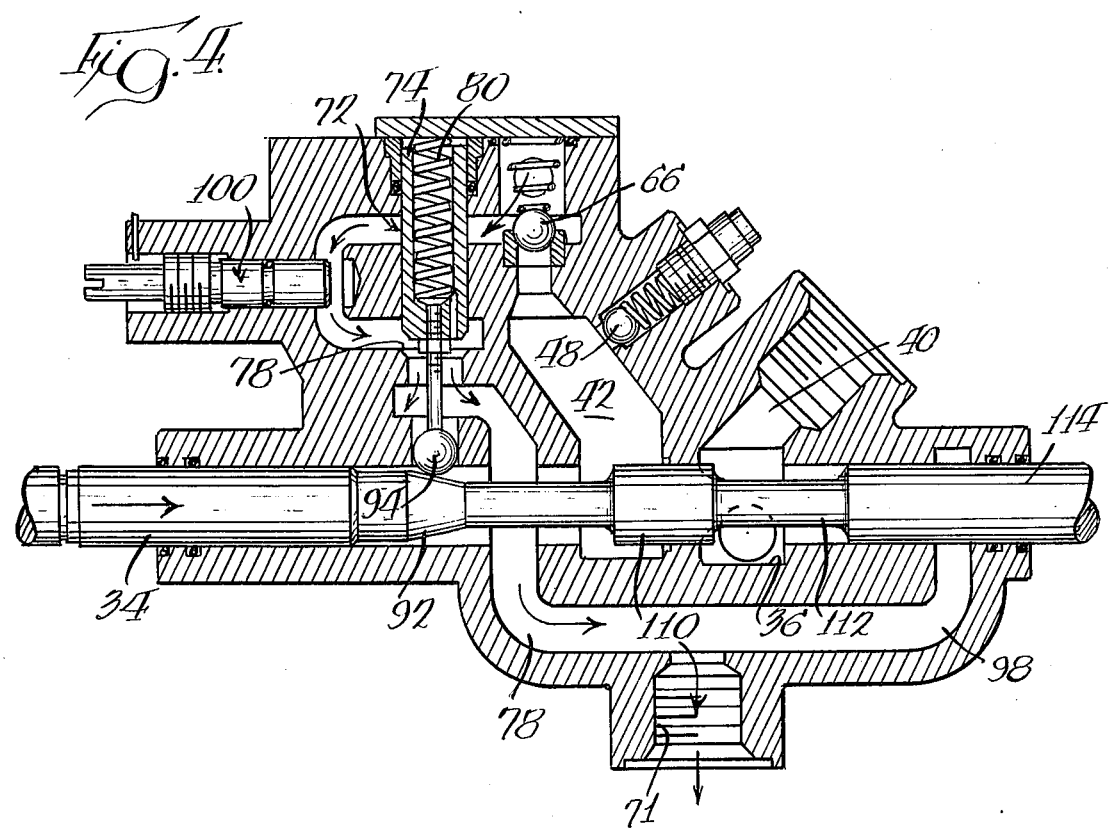
FIG. 4 is a view showing the valve spool in an opposite extreme position for draining fluid from the associated cylinders.

If the valve spool 34 is moved further to the right from the position illustrated in FIG. 4, the hydraulic control system is in the "float position" wherein flow between cylinder 14 and reservoir 18 is only restricted by regulator valve 100 (defining the desired maximum flow through passage 70), in which position, the implement is capable of seeking its own level with respect to the ground.

SUMMARY

As can be appreciated from the above description, the present invention provides an extremely simple control valve that can be constructed at a lower cost. Also, in the neutral position, the respective passages leading from fluid ram 12 are blocked by valve elements 66 and 74 and pressure chamber 42 is connected to reservoir 18 so that any leakage across land 110 cannot cause a pressure build up in pressure chamber 42 and produce undesired raising of the implement caused by valve spool leakage.

The arrangement of having both the pressure compensating passage 44 and the cylinder passage 60 open simultaneously to the pressure of the fluid received from pump 20 results in a system that has more rapid response for making small changes in the position of the implement.

The particular construction and arrangement of the various passages in the valve housing 30 as well as the orifice means 116 eliminates the need for flow dividers such as have previously been required to provide a system where the implement can be slowly raised for making changes in automatic draft load operation.

It should be noted that with the system described, when the engine is shut down and valve spool 34 is in a neutral position, spring biased valve element 74 blocks flow through passage 70 which prevents leakage when the valve is not in use. Thus, the implement can remain in the raised position while the engine is shut down.

What is claimed is:

1. In a tractor-implement hydraulic system having a valve interposed between a one-way implement-actuating assembly including a cylinder and piston, a reservoir and a variable displacement pressure compensated pump having pressure compensating means, said valve including a valve housing having a valve bore with a valve spool slidable in said bore, an inlet chamber in communication with said pump and said bore, a pressure chamber in communication with said bore at a location spaced from said inlet chamber, a first passage in said housing connected to said pressure compensating means and to said pressure chamber with unidirectional valve means in said first passage limiting flow from said pressure chamber to said pressure compensating means, a second passage in said housing connected to one end of said cylinder and in communication with said pressure chamber with unidirectional valve means in said second passage limiting flow from said pressure chamber to said cylinder, and a third passage in said housing connected to said one end of said cylinder and said reservoir, said third passage having means therein normally blocking flow through said passage, so that movement of said valve spool in one direction from a neutral position will interconnect said chambers to pressurize said pressure chamber and open both unidirectional valve means and movement of said valve spool in an opposite direction from said neutral position will open said third passage to connect said cylinder to said reservoir.

2. A hydraulic system as defined in claim 1, further including orifice means between said spool and said bore defining a variable orifice between said inlet chamber and said pressure chamber to provide metered flow at least during initial movement of said valve spool in said one direction.

3. A hydraulic system as defined in claim 1, in which said means in said third passage includes spring biased valve means biased to a closed position with means on said valve spool for opening said valve means when said spool is moved in said opposite direction.

4. A hydraulic system as defined in claim 1, in which said pressure chamber is in communication with said reservoir through said bore and said third passage when said valve spool is in a neutral position.

* * * * *